United States Patent Office 3,368,356
Patented Feb. 13, 1968

3,368,356
SOIL STABILIZATION METHOD
Edward D. Graf, 1680 Bryant St.,
Daly City, Calif. 94015
No Drawing. Filed Nov. 24, 1964, Ser. No. 413,639
10 Claims. (Cl. 61—36)

This invention relates to the stabilization of soil. In one aspect, it relates to the stabilization of soil by surface application of a liquid chemical grouting to the soil so as to create a type of friable sandstone blanket of substantial thickness with the top layer of the soil.

A number of techniques have been used for soil stabilization with grouting materials. These techniques generally involve subsurface injection procedures or surface application of solid containing materials which do not penetrate much beyond the surface of the soil, especially when working in fine sandy soils. In many cases these applications were executed by time consuming multi-stage placement of the chemical components, the chemical components reacting to make up the desired grouting upon union of the chemicals in the soil.

With the present invention a method is provided for rapidly covering an area needing stabilization by a relatively simple single stage surface treatment. The results produced by this method are characterized by a stabilization of the soil to considerable depth below the surface and a duration of the stabilized condition for extended periods of time.

Stated in the simplest terms in relation to the preferred embodiment, the invention involves a surface spray for application of a premixed single solution of liquid phase chemical grouting. The liquid grouting is free from undissolved solids and penetrates to the desired depth in the soil by spraying a sufficient quantity on the surface of the soil at a controlled rate. The chemical grouting solutions selected are of the type that remain liquid during the spray and penetration phases of the process and thereafter solidify and bond the solid particles together following placement of the liquid in the soil.

The success of the present technique was most unexpected for a number of reasons and particularly for the following two reasons. Although the ability of various chemical systems to bond or cement soil particles has been known for many years, a surface application of the present type was not heretofore considered feasible because the chemical systems normally comprise only 5 to 30% solids. When the pure gels formed therefrom are exposed to normal humidity conditions they desiccate into solids and are useless as binders. Since exposure to normal humidity was contemplated by the present surface spray application, it was believed that the present grouting would not serve as a good binder for the soil under the conditions so imposed.

Contrary to this reason why the materials could not be used in the present manner, it has been found that the chemicals can be surface sprayed and they will be absorbed into the soil whether on slopes, banks, or level ground and the disabling desiccation does not occur. While the precise mechanism responsible for prevention of desiccation is not known with certainty it appears that the residual ground moisture that is under the chemical blanket when the blanket is applied to the upper levels of the soil in some way helps maintain the water content sufficiently high in the chemical grouting to cause retention of its bonding capabilities.

In addition to the imagined desiccation problem, it has never been considered feasible to surface spray the chemical liquid grouting materials for another major reason. It was thought that a sufficiently deep penetration of the soil could not be accomplished in this manner. Consequently, the subsurface injection techniques have been prevalent in the past. Quite surprisingly, however, where it was expected that penetration of only a fraction of an inch of the earth would be achieved, it has been demonstrated that the penetration can be promoted to many inches—virtually to any desired depth depending upon the type of soil and volume of chemicals employed. Again, the reason why the penetration has been so successful is not fully appreciated. It is believed that penetration into terrain of almost any inclination from gradual slopes and even up to the vertical is accomplished by some form of capillary action, especially in fine grain soils where it is probably a true capillary action. In coarser grain soil the unexpected penetration may be due to the adhesion of the chemical solutions onto the surface of the soil particles which serves to draw the solution down into the soil mass.

The process has broad utility in the stabilization of soil. One of the more probable areas of benefit includes improving the structural properties of sand banks during construction excavations. Normally, when excavating in sand the banks must be held by lagging and bracing or else the slopes must be laid back to a safe angle such as a slope of two horizontal to one vertical. However, when the sand is first excavated the surface tensions of the residual moisture in the sand will hold the slopes up to quite steep angles. By stabilizing the sand bank with the present method shortly after completion of the excavation and creating a blanket of grouting of sufficient thickness, it is possible to hold the residual moisture in the sand which, together with the additional retaining strength of the particle bonding action of the grouting, results in a very secure configuration of the soil. Excavations have been successfully held up under these conditions for a period of several months by using the present invention in the above manner.

Other areas of utility for the present process are in the protection of slopes from wind and rain erosion. Tests conducted in the Nevada desert and on an ocean palisade are most promising in this regard.

Another area of utility is in the lining of water channels, especially through sandy areas. Lining such areas prevents loss of the water through seepage into the soil. Tests indicate that use of the present invention including a top sealing coating as will be described also produces a marked increase in erosion resistance in such channels.

In like vein, the method can be used in conjunction with erecting a retaining wall in place and holding slopes that might otherwise fall or for retaining moisture in soils generally, or keeping moisture from entering soils, as well as for the lining of reservoirs, dams, process solution pits and the like.

Turning to the details of the process, any suitable liquid chemical grouting system, frequently referred to as a 1-shot chemical grouting system, may be used which will in time solidify and bond the soil particles together. In the preferred aspect of the invention the chemical grouting system should remain liquid without any appreciable solidification for some period of time and only thereafter should it gel or solidify. This permits maximum flexibility in the manipulations necessary for actually placing the chemicals on the soil surface and for obtaining penetration to the desired depth. Typical of the preferred systems are mixtures of alkali metal silicates and salts of weak acids. For example, sodium silicate and sodium bicarbonate in water provides a very desirable grouting system. Other systems which have the capability of remaining at a very low viscosity for a definite period of time and which only thereafter gel and solidify are systems such as sodium silicate-formamide, catalyzed solutions of acrylic monomers and other monomer systems as will be clear to those skilled in the art.

Other types of materials which are initially liquid but gradually increase in viscosity from the time that the system is made up ready for application and continue until they eventually form a solid are not as desirable for deep penetration work. They can be used, however, particularly where deep penetration is of less importance. Typical of these systems are the epoxy resins.

The selected chemical grouting system must be in liquid phase and free from suspended solids. Suspended solids even of a colloidal type must not be present or the pores of the soil being treated will become clogged and prevent penetration of the grouting to the desired depth.

The method of application can be varied as desired and simply requires some technique for spreading the liquid solution over the surface of the soil to be treated. The most advantageous method for accomplishing this is with the use of conventional spray equipment and techniques. Spray techniques permit rapid and uniform application of the solutions to the soil surface with little regard for the terrain and its location.

The amount of solution to be applied as by spraying is variable and will depend on the type of soil, the depth of penetration desired, and the particular chemicals being utilized. In general, by establishing the void ratio of the in situ soil and/or by relying upon past experience in working with similar chemicals and soils, the amount of solution that should be employed per unit area for the desired depth of penetration may be calculated. By controlling the amount of solution applied to a unitary area and controlling this factor for each unit of area throughout the job site, a generally uniform average depth of penetration and thickness of the resulting grouting blanket can be obtained.

Once the amount of solution to be applied is arrived at, it is important to control the rate of application per unit area. This is necessary to allow penetration of the liquid into the soil. The rate of application varies with the viscosity of the chemical system being used, the surface tension characteristics of the chemical system (which can be changed as desired with the addition of surfactants, for example), the particle size of the soil being treated, the slope of the soil being treated, the density of the soil in situ, and the permeability of the soil. For a reasonably deep penetration it will generally be necessary to repeatedly coat a given area of surface of the soil with the solution, doing one area and moving to the next and then back again to the first area after the initial application has entered into the pores of the soil. The rate of application is preferably controlled so that the liquid is coated on the soil surface no faster than the soil will absorb the liquid.

In practicing this technique it should be clear that it is most important that the solution utilized should remain in the liquid phase during the application to the soil surface and during the time it takes for the liquid to penetrate through the soil to the desired depth. If there is substantial thickening or solidification of the solution it will form a layer at the soil surface, closing off the pores and preventing further penetration of the chemicals. Depth of penetration is generally limited only by the gel or solidification time interval between first mixing up the grouting solution and the time it has solidified and bonded the soil particles together. Where solutions that remain fluid without any substantial increase in viscosity for a reasonable time are utilized, penetrations of over 12 inches have been readily obtained on vertical banks of fine sand, the limit of penetration not having been approached even at this point.

After the grouting solution has been applied and penetration to the desired depth accomplished through application of a sufficient quantity of the liquid to the surface, the grouting solidifies and bonds the soil particles together to form a rock-like blanket which may resemble sandstone. The hardness, strength, erosion resistance and similar properties will vary with the particular chemical system selected and with variations in the amounts of materials within a particular system as will be understood by those in this art.

Where a moisture impervious seal coating over the surface of the area is desired, the top coating chemical can be sprayed or otherwise applied to form such a seal. The seal coat has several advantages and is primarily useful in preventing moisture escape and desiccation of the grouting. In the preferred embodiment it is advantageous to select a chemical which will react with the grouting chemicals already in place so as to form a hard outer skin on the surface of the job site. For example, where the grouting solution comprises an alkali metal silicate such as sodium silicate, together with a gelling agent such as sodium bicarbonate, a calcium chloride solution when sprayed over the job site surface will provide a hard substantially impervious skin by reaction with the sodium silicate grouting solution. Many other materials which do not necessarily react with the grouting but which form the moisture impervious seal are contemplated for this purpose. Coatings formed from aqueous emulsions of various plastic materials have been used for this purpose.

It is also a preferred technique to compact any loose soil that may exist sometime during the treatment of the soil to obtain maximum stabilization. This might be accomplished before or after application of the grouting. Best results are obtained where the compaction occurs right after the grouting chemicals have been applied, and may be accomplished by any suitable technique such as rolling the surface of the soil. This compaction has particular advantage when dealing with loosened sandy soils or where a relatively thin blanket of the grouting has been applied.

The following example is offered to illustrate the use of the present invention.

*Example*

The area to be treated was composed of very fine sand termed "blow sand" which formed a slope about 35 feet high and had been sloughing badly. The bottom two-thirds of the slope was loose sand forming a slope of about one and one-half horizontal to one vertical. The top one-third of the area approached the slope of one horizontal to four vertical and was quite dense. The top material was continually loosening and sliding onto the lower portions of the site.

A liquid grouting chemical solution was prepared as follows. In a first tank, 86 gallons of 41° Baumé sodium silicate and 54 gallons of water (140 gallons total) were mixed. In a second tank, 60 pounds of sodium bicarbonate and water were mixed to form a solution of 140 gallons volume. The materials from the first and second tanks were then brought together in a third tank in equal volume and mixed to provide a solid-free liquid solution. From the time of mixing the solution in the first and second tanks together it was determined that 45 minutes elapsed before any substantial gelling or solidification of the solution occurred.

After mixing the solutions of the first and second tanks together, the pre-mixed grouting solution was then pumped with an air operated duplex piston pump through a hose to a one-half inch pipe fitted with an ordinary spray tip at the end. The spray tip was kept moving over the job site which had a measured area of 400 square feet (the area to be treated was divided into a number of "job sites" only one of which is described here) so as to obtain a generally uniform coverage over the area with the solution. The rate of application to any given area was controlled so that the liquid applied to the surface was in an amount not exceeding the rate of penetration. By so controlling the rate of application, movement back and forth repeatedly over the entire 400 square feet of area was required in order to apply the full 280 gallons of solution.

Following application of the 280 gallons over the above 400 foot area the results were inspected. It was determined that the area was uniformly covered with a friable sandstone blanket measuring about 5 inches in thickness. This sandstone blanket held the slope from further sloughing for several months after which it was filled over during subsequent use of the land.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. An improved method for stabilizing the soil comprising: spraying the surface of the soil to be stabilized with a single solution of a solid-free liquid phase chemical grouting selected from the group consisting of alkali metal silicates in combination with a gelling agent therefore, and polymer forming catalyzed solutions of monomers and low molecular weight molecules at a controlled rate and in a sufficient amount as the sole cause of grouting penetration of soil to a preselected depth, said grouting solution being of the one-shot type that penetrates in the liquid phase and then solidifies in place after penetration to bond the soil particles together.

2. An improved method for stabilizing soil comprising: premixing chemicals to form a single solution of a solid-free one-shot liquid phase chemical grouting selected from the group consisting of alkali metal silicates in combination with a gelling agent therefore, and polymer forming catalyzed solutions of monomers and low molecular weight molecules, repeatedly spraying said premixed liquid solution in generally uniform layers over the soil surface to be stabilized at a controlled rate in relation to absorption by the soil and in a sufficient amount to generally uniformly penetrate the soil to a preselected depth sufficient to cause a significant stabilization of the soil, said liquid phase chemical grouting unaidedly penetrating to said preselected depth in the absence of physical manipulation of the soil to promote said penetration said grouting solution being of the type that solidifies in place after penetration to bond the soil particles together.

3. A method in accordance with claim 2 wherein said grouting solution is of the type exhibiting substantially no solidification until after penetration to said preselected depth.

4. An improved method in accordance with claim 2 and including the step of compacting the soil to be stabilized prior to spraying with the chemical grouting solution.

5. An improved method in accordance with claim 2 including the step of compacting the soil by rolling the soil after spraying the surface with said chemical grouting solution.

6. An improved method in accordance with claim 2 and including the step of applying a top coating to the surface of the soil after spraying with said chemical grouting solution to form a moisture impervious coating over the soil surface.

7. An improved method in accordance with claim 2 and including the step of applying a top coating to the surface of the soil after spraying with said chemical grouting solution to form a hard surface skin, said top coating comprising a chemical that reacts with the grouting solution to form the hard skin.

8. An improved method in accordance with claim 2 wherein said single solution of chemical grouting is formed by mixing an alkali metal silicate with a gelling agent therefor.

9. A method in accordance with claim 8 wherein said alkali metal silicate is sodium silicate and said gelling agent is sodium bicarbonate.

10. A method in accordance with claim 9 and including forming a hard surface skin over the soil to be stabilized following spraying of said liquid chemical grouting by spraying a calcium chloride solution on the soil surface.

References Cited

UNITED STATES PATENTS

| | | | |
|---|---|---|---|
| 991,043 | 5/1911 | Ward | 94—25 |
| 2,176,266 | 10/1939 | Malmberg | 61—36 |
| 2,937,581 | 5/1960 | Havelin | 94—25 X |
| 2,968,572 | 1/1961 | Peeler | 61—36 X |
| 3,077,054 | 2/1963 | Niemeijer | 61—36 X |
| 3,202,214 | 8/1965 | McLaughlin | 61—36 X |
| 3,286,475 | 11/1966 | Adams | 61—36 |
| 3,288,040 | 11/1966 | Burrows | 94—25 |

FOREIGN PATENTS

| | | |
|---|---|---|
| 573,830 | 4/1959 | Canada. |
| 517,088 | 1/1940 | Great Britain. |
| 755,850 | 8/1956 | Great Britain. |

OTHER REFERENCES

Roads and Streets, April 1953, page 81.

JACOB SHAPIRO, *Primary Examiner.*